(12) United States Patent
Young

(10) Patent No.: US 6,257,644 B1
(45) Date of Patent: *Jul. 10, 2001

(54) WINDOW TRIM MOLDING WITH ADHESION PROMOTER

(75) Inventor: Jack D. Young, Montgomery County, OH (US)

(73) Assignee: Creative Extruded Products, Inc, Tipp City, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/548,850

(22) Filed: Apr. 13, 2000

Related U.S. Application Data

(63) Continuation of application No. 09/488,049, filed on Jan. 20, 2000.

(51) Int. Cl.[7] .................................................. B60J 10/02
(52) U.S. Cl. ................................................................ 296/93
(58) Field of Search ........................... 296/146.15, 93, 296/200, 96.21, 201; 52/208, 204.597, 204.591, 716.8, 717.01; 156/108, 315

(56) References Cited

U.S. PATENT DOCUMENTS

| | | | |
|---|---|---|---|
| 4,813,733 | * 3/1989 | Gustafson et al. | 296/93 |
| 4,905,432 | * 3/1990 | Romie | 52/208 |
| 5,001,876 | * 3/1991 | Harper et al. | 52/208 |
| 5,032,444 | * 7/1991 | Desir, Sr. | 428/122 |
| 5,057,265 | 10/1991 | Kunert et al. | 264/511 |
| 5,088,787 | * 2/1992 | Gross | 296/93 |
| 5,154,028 | 10/1992 | Hill et al. | 52/208 |
| 5,273,338 | * 12/1993 | Gooding | 296/146.15 |
| 5,311,711 | 5/1994 | Desir, Sr. | 52/208 |
| 5,316,829 | 5/1994 | Cordes et al. | 428/192 |
| 5,338,087 | 8/1994 | Gross et al. | 296/146.15 |
| 5,480,207 | * 1/1996 | Gold | 296/93 |
| 5,860,688 | * 1/1999 | Biondo et al. | 296/93 |
| 5,988,730 | * 11/1999 | Bekaert | 296/146.15 |

FOREIGN PATENT DOCUMENTS

| | | | | |
|---|---|---|---|---|
| 1 394 271 | * | 5/1975 | (GB) | 156/324.4 |
| 1 576 394 | * | 10/1980 | (GB) | 156/324.4 |

OTHER PUBLICATIONS

Plastics Handbook, 1994, pp. 67–68.*
Rubin, Handbook of Plastic Materials and Technology, 1990, p. 520.*

* cited by examiner

Primary Examiner—D. Glenn Dayoan
Assistant Examiner—Patricia L. Engle
(74) Attorney, Agent, or Firm—Reuben Wolk

(57) ABSTRACT

A window trim molding having improved adhesion between at least one of the edges of the periphery of the window, and at least one of the window-contacting portions of the molding. This is accomplished by co-extruding with the principal molding material, a second material which is a thermoplastic polyurethane, on at least one of the window-contacting portions of the molding. An adhesive is applied to the window edges, and the second elastomeric material acts as an adhesive promoter compatible with the adhesive.

12 Claims, 2 Drawing Sheets

WINDOW TRIM MOLDING WITH ADHESION PROMOTER

CROSS-REFERENCE TO RELATED APPLICATION

This application is a Continuation-in-Part application of Ser. No. 09/488,049, filed Jan. 20, 2000.

BACKGROUND OF THE INVENTION

The present invention relates to a window trim molding, also known as a "reveal molding" or "lace", for gripping and retaining or being adhered to at least one edge of the outer periphery of a fixed window, such as a windshield, rear window or fixed side windows of an automotive vehicle. The molding also conceals the space between the edge of the window and an adjacent body panel.

PRIOR ART STATEMENT

It is standard procedure to promote the adhering of at least one of the edges of the windows by molding members, utilizing adhesives. Normally this is accomplished by applying a bead of an adhesive material to one or more edges of the upper and lower planar surfaces of the window glass, or to the vertical edge of the glass which extends between the planar surfaces, then applying a liquid primer material to part of the window-gripping portions of the molding. The primer is usually a blend of methyl ethyl ketone, toluene, and methyl methacrylate.

SUMMARY OF THE INVENTION

The present invention provides for an improved molding in which the adhesion between the molding and the window edge is greatly improved and overcomes certain drawbacks of the above-described system which uses a liquid primer material; for instance:

1. The prior art primer is composed of materials which may be hazardous because of their toxicity and potential fire hazards.
2. The application of this material to the surfaces of the flexible molding creates difficult handling problems, leading to inconsistency in application, whether by brushing, wiping, or similar processes.
3. The primer material is affected by aging and by evaporation of some of the components, thus affecting the viscosity and effectiveness of the material.
4. It is necessary to provide special equipment for controlling the fumes of the primer, and for drying it after the application to the surfaces of the molding.
5. When inspecting the molding for quality control after the primer is applied, it is difficult to detect the primer coating.
6. The shelf life of the primer is very short, usually a maximum of 90 days, so that moldings which have been stored for future application, particularly for after-market use, may lose their effectiveness.
7. Because of the difficulty in handling referred to above, some of the primer material may overflow the gripping surfaces of the molding and stain the outer visible surface, leading to an unsightly appearance or a high scrap rate.

All of the above problems are eliminated by the present invention; rather than applying a liquid primer during extrusion or after fabrication, as in the prior art, an adhesion promoter is co-extruded with the molding and provides superior results. By using a thermoplastic polyurethane as a co-extruded material on the inner window edge-contacting surfaces, the typical problems are eliminated and a better but less expensive product results. The handling of hazardous materials and the short shelf life problems are eliminated. In addition the promoter may be colored to make its presence more easily detected.

Therefore it is a principal object of the invention to provide an automotive window molding which has improved window adhering features.

It is an additional object to provide a molding that is more consistent in its construction.

It is another object to provide a molding having an increased shelf life.

It is a further object to provide such a molding by a simplified process which is safer and less costly.

These and other objects and features will become apparent from the embodiments described and shown herewith.

DESCRIPTION OF THE PREFERRED EMBODIMENT

Figure 1:
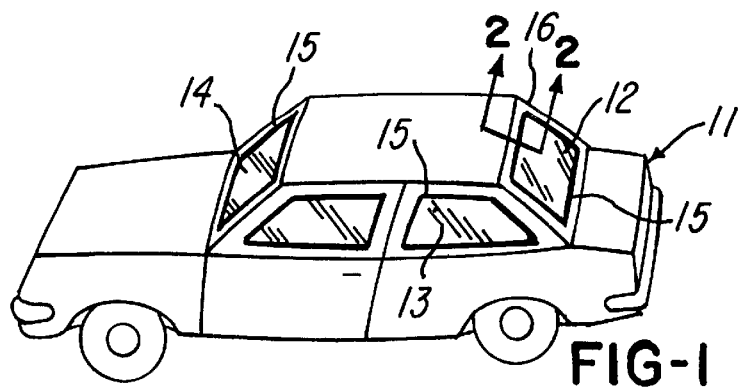
FIG. 1 is a perspective view of a typical automotive vehicle illustrating various locations of the novel molding.
Figure 2:
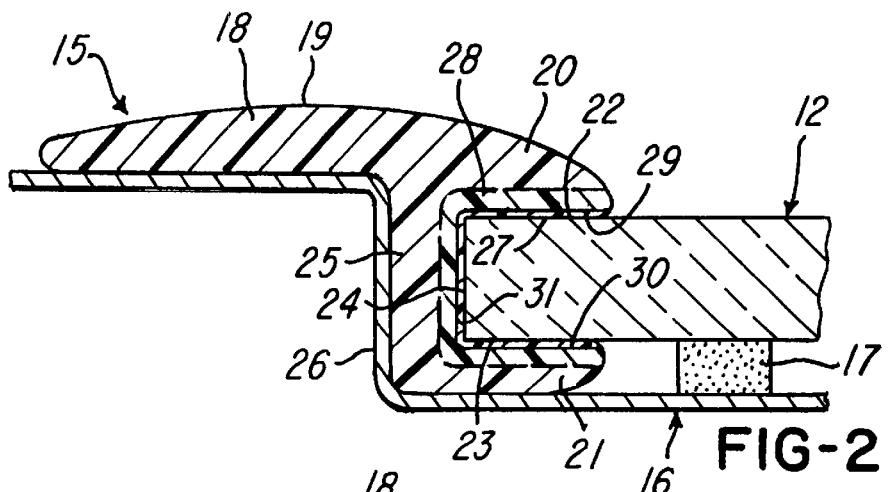
FIG. 2 is an enlarged sectional view taken along line 2—2 of FIG. 1 illustrating a typical installation of the molding on the window.
Figure 3:
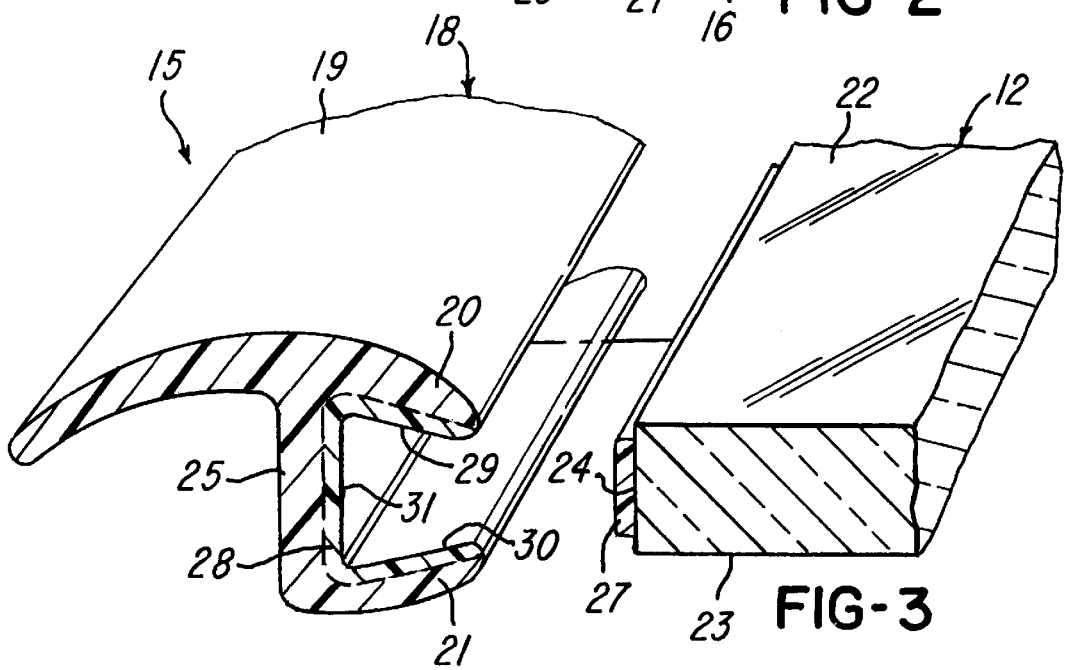
FIG. 3 is an enlarged detail of a portion of the novel molding and a portion of an associated window, prior to installation on the window and the vehicle.

As shown in FIG. 1, the automobile 11 is typical of a motor vehicle which contains, among other parts, a fixed rear window 12, fixed side windows 13, and the windshield 14. The novel molding 15 is manufactured as a continuous strip and extends around the entire periphery of the rear and side windows, as well as the upper and side portions of the windshield. As shown in FIG. 2, the rear window 12 is typical of all the fixed windows, and is attached to the adjacent body panel 16 by means of an adhesive 17, or by other means known in the art, such as referred to in U.S. Pat. No. 5,338,087, issued to Gross et. al. (of common assignment). The molding 15 is principally composed of an elastomeric material such as polyvinyl chloride, having a hardness of about 80 to 90 Shore "A", which is the material commonly used in the manufacture of moldings, and which may contain filler material. The main body 18 extends over the body panel and the edge of the outer planar surface of the window and thus conceals the space between the body panel and the edge of the window. The outer surface 19 of the body 18 is visible from the exterior of the vehicle. The body 18 comprises an outer leg or segment 20 and an inner leg 21; these legs cooperate to grip the outer edge of the window. The term "edge" collectively consists of the outer portion of the upper planar surface 22, the outer portion of lower planar surface 23, and the vertical surface 24 which extends between the upper and lower planar surfaces. The body 18 further comprises a stem section 25 which contacts the surface 26 of the body panel. In order to adhere the molding to the window edge, a bead 27 of urethane, approximately 0.025 to 0.050 inch thick is applied to the vertical surface 24 of the window edge, as shown in FIG. 3. But instead of applying a liquid primer as an adhesion promoter to the inner surfaces of the legs 20 and 21 as in the prior art, the promoter is applied in the form of a second elastomeric material 28 which is co-extruded with the principal material as a layer on the window edge-contacting portions of the legs 20 and 21 and the stem section 25. This co-extrusion is done in a manner well known in the art, as shown for example in U.S. Pat. No. 5,311,711 issued to Desir, Sr.

The second elastomeric material 28 is a thermoplastic polyurethane (TPU), which is well-known in the industry, and is sold under various trade names. This material has a thickness between 0.005 and 0.020 inch, and becomes unitary with the primary material so that the entire molding is monolithic. The juncture of the principal material and the second material is shown in dash lines. The second elastomeric material extends along the inner surface of the leg 20 and has a window edge-ripping surface 29 which contacts the upper planar surface 22 of the window edge; also extends along the inner surface of leg 21 to form window gripping-surface 30 to contact lower planar surface 23 of the window edge; and extends along the inner surface of the stem section 25 to form a window contacting surface 31 that contacts the vertical surface 24 of the window edge. The legs 20 and 21 and stem section 25 thus form a channel which is placed over the window edge. Pressure of the channel causes thermoset polyurethane bead 27 to spread around the window edge to the position show in FIG. 2 to form a layer of about 0.010 to 0.020 inch thick. It should be understood that the extent of the spreading of the urethane material may depend on the amount of material which is applied. It is also understood that optional methods of applying the urethane include caulking, pumping, or wiping a thin coating along any portion of the edge, whether planar surfaces or vertical surface thereof; or applying directly to the molding itself. It is also possible to limit the extent of the second elastomeric material to a portion only of the inner surfaces of the legs or the stem section. Whichever method is used, at least some of the adhesion promoter surfaces 29, 30 and 31 of the material 28 will promote adhesive contact with the urethane material 27 to create improved adhesion of the molding to the window edge. The resulting product provides the many advantages set forth under the summary of the invention.

DESCRIPTION OF ANOTHER EMBODIMENT

In certain automotive glazing designs, it is sometimes desired to apply the molding to the inner surface edge only of the window, rather than providing a structure such as set forth above. Such a design is shown, for example in the patent to Hill et al. U.S. Pat. No. 5,154,028; and in a series of patents issued to Kunert et. al., of which. U.S. Pat. No. 5,057,265 is typical; and in a series of patents issued to Cordes et. al., of which U.S. Pat. No. 5,316,829 is typical. In all these patents, the molding is adhered to the window by the use of an adhesive, similar to the prior art referred to above with respect to the preferred form of the invention. In this form of the present invention, Applicant overcomes the deficiencies of the prior art by co-extruding the thermoplastic polyurethane referred to above with the primary elastomer, in the form of a strip having a generally rectangular cross-section, and having a flexible integral member that is used to conceal the space between the window edge and the vehicle body. This strip molding is adhered to the window edge in a manner similar to that described above with respect to the preferred form.

Figure 4:
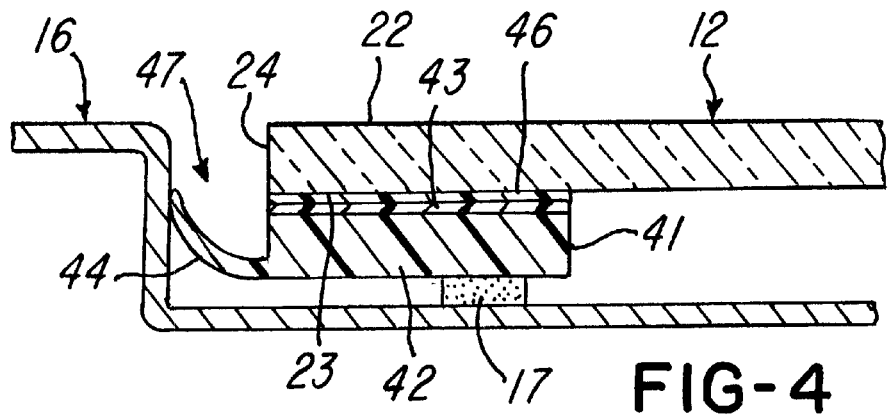
FIG. 4 is a view similar to FIG. 2, illustrating another form of the invention.
Figure 5:
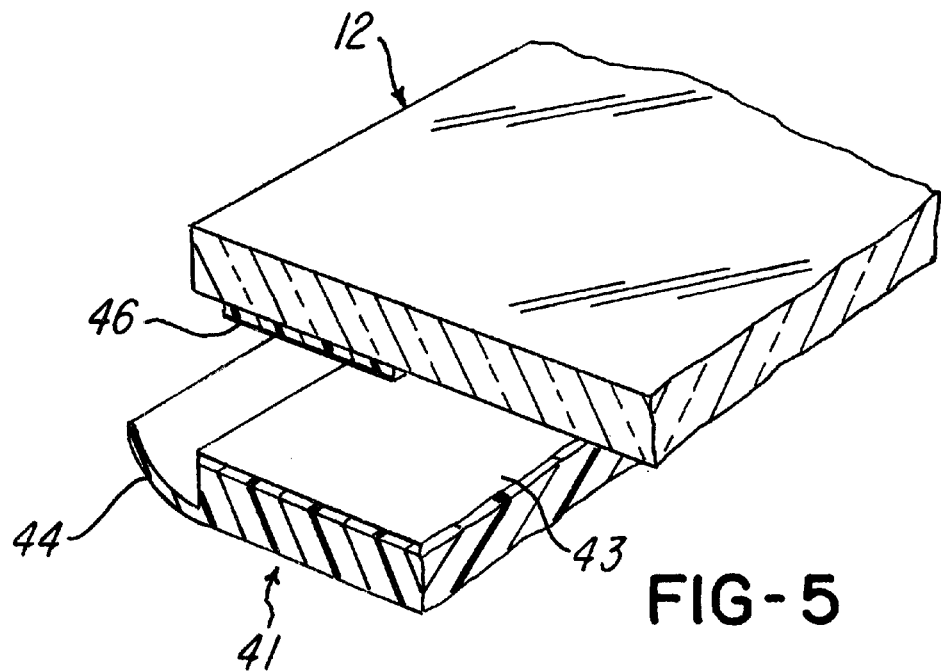
FIG. 5 is a view similar to FIG. 3, illustrating the molding of FIG. 4 prior to installation.

As shown in FIG. 4, the rear window 12, which is typical, is attached to the body panel 16 by means of adhesive 17, similar to the manner of FIG. 2. The novel molding 41 is in the form of a strip having a generally rectangular cross-section, which may vary in shape, and is composed of a principal elastomeric material 42, such as polyvinyl chloride, similar to the principal material of molding 15. An inner layer 43 is co-extruded with material 42, and has a surface which contacts the inner planar edge surface 23 of the periphery of the window. This layer 43 is formed of the same thermoplastic polyurethane (TPU) as the material layer 28 of the preferred form. During co-extrusion, the layer 43 becomes unitary with the body 42 so that the molding is monolithic, just like the layer 28 and the body 18 in the principal form referred to above. This unitary structure prior to installation is shown in FIG. 5. Extending toward body panel 16 and away from the inner surface of the molding strip is a thinner flexible Member 44 which extends along the entire length of the molding strip. This member is formed of the same or similar material as the layer 42 and is extruded therewith so that it is unitary with layer 42. The molding strip is adhered to the window edge by applying a bead 46 made of thermoset polyurethane, approximately 0.025 to 0.050 inch thick, in the same manner and of the same material a bead 27 described above. The molding is pressed against the bead so that layer 43 contacts the bead 46 and causes the bead to form a thinner layer of about 0.010 to 0.020 inch and thus cause bonding or adhesion of the strip to the glass because of the composition of layer 43. The flexible member 44 will contact the body panel as shown and thus close off the gap 47 to conceal the opening between the vertical window edge 24 and the body panel. After final assembly, the molding will be revealed through the window edge, but if it is desired to conceal the molding, it is contemplated that a coating of dark material may be applied to the outer edge 22 of the glass.

The above embodiments are exemplary, but other modifications thereof are within the scope of the invention.

What is claimed is:

1. In an automotive vehicle having a body panel and an adjacent window having an outer edge and a space between said body panel and said outer edge, an elastomeric window molding having a generally rectangular cross-section extending around at least a portion of said outer edge of said window and adapted to contact at least a portion of the inner planar surface of said outer edge of said window; the improvement wherein said molding is principally composed of a first elastomeric material and said outer edge-contacting portion is composed of a second elastomeric material of thermoplastic polyurethane integral with said first elastomeric material, and a polyurethane adhesive applied to at least a portion of said outer edge, said adhesive being compatible with said second elastomeric material and adapted to promote adhesion between said molding and said outer edge when said outer edge-contacting portion is placed on said outer edge of said window.

2. The molding of claim 1 wherein said first and second elastomeric materials are co-extruded.

3. The molding of claim 1 wherein said second elastomeric material forms a layer between 0.005 and 0.02 inch thick.

4. The molding of claim 1 further comprising a flexible member extending outwardly from a surface of and integral with said molding and adapted to extend around said at least a portion of the periphery of said window and into said space.

5. In combination, an automotive vehicle having a body panel and an adjacent window having an outer edge and a space between said body panel and said outer edge, an elastomeric window molding having a generally rectangular cross-section extending around at least a portion of the said outer edge of said window and contacting at least a portion of the inner planar surface of said outer edge of said window; the improvement wherein said molding is principally composed of a first elastomeric material and said window edge-contacting portion is composed of a second elastomeric material of thermoplastic polyurethane integral with said first elastomeric material, and a polyurethane adhesive applied to a least a portion of said outer edge, said adhesive being compatible with said second elastomeric material to promote adhesion between said outer edge-contacting portion and said outer edge of said window.

6. The molding of claim 5 wherein said first and second elastomeric materials are co-extruded.

7. The molding of claim 5 wherein said second elastomeric material forms a layer between 0.005 and 0.02 inch thick.

8. The molding of claim 5 further comprising a flexible member extending outwardly from a surface of and integral with said molding, and extending around said at least a portion of the periphery of said window and into said space.

9. In an automotive vehicle having a body panel and an adjacent window having an outer edge and a space between said body panel and said outer edge, and an elastomeric molding having a generally rectangular cross-section extending around at least a portion of said outer edge of said window and contacting at least a portion of the inner planar surface of said outer edge of said window; the improved method of forming said molding principally of a first elastomeric material, forming said outer edge-contacting portions of a second elastomeric material of thermoplastic polyurethane integral with said first elastomeric material, applying a polyurethane adhesive compatible with said second elastomeric material to at least a portion of said outer edge of said window for promoting adhesion between said molding and said window, and adhering said outer edge-contacting portion to said at least a portion of said outer edge.

10. The method of claim 9 comprising the step of co-extruding said first and second elastomeric materials.

11. The method of claim 9 comprising the step of forming said second elastomeric material in a layer between 0.005 and 0.02 inch thick.

12. The method of claim 9 comprising the further steps of providing a flexible member extending outwardly from a surface of and integral with said molding, and extending said flexible member into said space.

* * * * *